(12) United States Patent  (10) Patent No.: US 7,455,757 B2
Oh et al.  (45) Date of Patent: Nov. 25, 2008

(54) DEPOSITION METHOD FOR NANOSTRUCTURE MATERIALS

(75) Inventors: Soojin Oh, Chapel Hill, NC (US); Otto Z. Zhou, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 637 days.

(21) Appl. No.: 10/615,842

(22) Filed: Jul. 10, 2003

(65) Prior Publication Data

US 2004/0055892 A1    Mar. 25, 2004

Related U.S. Application Data

(63) Continuation-in-part of application No. 09/996,695, filed on Nov. 30, 2001.

(51) Int. Cl.
    *C25D 13/02* (2006.01)
(52) U.S. Cl. .................................. 204/490; 204/491
(58) Field of Classification Search ................. 204/490, 204/491
    See application file for complete search history.

(56) References Cited

U.S. PATENT DOCUMENTS

| | | | |
|---|---|---|---|
| 3,037,923 | A | 6/1962 | Gnau |
| 5,296,117 | A | 3/1994 | De Jaeger et al. |
| 5,906,721 | A | 5/1999 | Bojkov et al. |
| 6,057,637 | A | 5/2000 | Zettl et al. |
| 6,258,237 | B1 | 7/2001 | Gal-Or et al. |
| 6,277,318 | B1 | 8/2001 | Bower et al. |
| 6,280,697 | B1 | 8/2001 | Zhou et al. |
| 6,333,968 | B1 | 12/2001 | Whitlock et al. |
| 6,334,939 | B1 | 1/2002 | Zhou et al. |
| 6,342,755 | B1 | 1/2002 | Russ et al. |
| 6,401,526 | B1 | 6/2002 | Dai et al. |
| 6,420,293 | B1 | 7/2002 | Chang et al. |
| 6,422,450 | B1 | 7/2002 | Zhou et al. |

(Continued)

FOREIGN PATENT DOCUMENTS

CN  1273215  11/2000

(Continued)

OTHER PUBLICATIONS

International Preliminary Report for PCT/US2004/020150 dated Apr. 6, 2006.

(Continued)

*Primary Examiner*—Arun S Phasge
(74) *Attorney, Agent, or Firm*—Jenkins, Wilson, Taylor & Hunt, P.A.

(57) ABSTRACT

A method for depositing a patterned coating of a nanostructure material onto a substrate includes: (1) forming a solution or suspension of containing the nanostructure material; (2) masking at least a portion of at least one surface of the substrate (3) immersing electrodes in the solution, the substrate upon which the nanostructure material is to be deposited acting as one of the electrodes or is electrically connected to at least one electrode; (4) applying a direct and/or alternating current electrical field between the two electrodes for a certain period of time thereby causing the nanostructure materials in the solution to migrate toward and attach themselves to the substrate electrode; and (5) subsequent optional processing.

38 Claims, 10 Drawing Sheets

U.S. PATENT DOCUMENTS

| | | | |
|---|---|---|---|
| 6,456,691 | B2 | 9/2002 | Takahashi et al. |
| 6,457,350 | B1 | 10/2002 | Mitchell |
| 6,528,785 | B1 | 3/2003 | Nakayama et al. |
| 6,553,096 | B1 | 4/2003 | Zhou et al. |
| 6,616,497 | B1 | 9/2003 | Choi et al. |
| 6,630,772 | B1 | 10/2003 | Bower et al. |
| 6,652,967 | B2 | 11/2003 | Yadav et al. |
| 6,787,122 | B2 | 9/2004 | Zhou |
| 6,824,755 | B2 | 11/2004 | Colbert et al. |
| 6,850,595 | B2 | 2/2005 | Zhou et al. |
| 6,875,329 | B2 | 4/2005 | Washizu et al. |
| 6,876,724 | B2 | 4/2005 | Zhou et al. |
| 6,879,143 | B2 | 4/2005 | Nagahara et al. |
| 6,980,627 | B2 | 12/2005 | Qiu et al. |
| 7,014,743 | B2 | 3/2006 | Zhou et al. |
| 7,252,749 | B2 | 8/2007 | Zhou et al. |
| 2002/0094064 | A1 | 7/2002 | Zhou et al. |
| 2002/0140336 | A1 | 10/2002 | Stoner et al. |
| 2002/0193040 | A1 | 12/2002 | Zhou |
| 2003/0002627 | A1 | 1/2003 | Espinosa et al. |
| 2003/0044519 | A1 | 3/2003 | Takai |
| 2003/0094035 | A1 | 5/2003 | Mitchell |
| 2003/0102222 | A1 | 6/2003 | Zhou et al. |
| 2003/0111946 | A1 | 6/2003 | Talin et al. |
| 2003/0180472 | A1 | 9/2003 | Zhou et al. |
| 2003/0233871 | A1 | 12/2003 | Nguyen et al. |
| 2004/0028183 | A1 | 2/2004 | Lu et al. |
| 2004/0038251 | A1 | 2/2004 | Smalley et al. |
| 2004/0055892 | A1 | 3/2004 | Oh et al. |
| 2004/0108298 | A1 | 6/2004 | Gao |
| 2004/0240616 | A1 | 12/2004 | Qiu et al. |
| 2004/0256975 | A1 | 12/2004 | Gao et al. |
| 2005/0133372 | A1 | 6/2005 | Zhou et al. |
| 2005/0226361 | A1 | 10/2005 | Zhou et al. |
| 2005/0269559 | A1 | 12/2005 | Zhou et al. |
| 2005/0281379 | A1 | 12/2005 | Qiu et al. |
| 2006/0008047 | A1 | 1/2006 | Zhou et al. |
| 2006/0018432 | A1 | 1/2006 | Zhou et al. |

FOREIGN PATENT DOCUMENTS

| | | |
|---|---|---|
| EP | 0 989 579 A2 * | 9/1999 |
| EP | 0989579 | 9/1999 |
| GB | 2353138 A | 2/2001 |
| JP | 08170193 | 7/1996 |
| JP | 10237362 | 9/1998 |
| JP | 2001110303 | 4/2001 |
| JP | 2001167692 | 6/2001 |
| JP | 2002301700 | 10/2002 |
| WO | 03075372 | 9/2003 |

OTHER PUBLICATIONS

International Search Report for PCT/US04/20150 dated Mar. 10, 2006.
B. Gao et al., "Fabrication and Electron Field Emission Properties of Carbon Nanotube Films by Electrophoretic Deposition", *Advanced Materials*, vol. 13, Issue 23, pp. 1770-1773, published online Nov. 23, 2001.
A. M. Affoune et al., "Electrophoretic Deposition of Nanosized Diamond Particles", *Langmuir*, vol. 17, No. 2, 2001, pp. 547-551.
Bower, Chris et al., "Plamsa-induced alignment of carbon nanotubes", Applied Physics Letters, vol. 77, No. 6, pp. 830-832; Aug. 7, 2000.
Journet, C. et al., "Large-scale production single-walled carbon nanotubes by electric-arc technique", Nature, vol. 388, pp. 757-760; Aug. 1997.
Chinese Office Action for Chinese Patent Application No. 02827708.2 dated Jan. 12, 2007.
Zhengping et al., "Progress In Bulk-Optic-Material Current Sensors", *Lasers and optoelectronics progress 1999*, vol. 36, 8, pp. 6-12.
Chinese Office Action for Chinese Patent Application No. 02827708.2 dated Sep. 7, 2007.
Korean Intellectual Property Office (KIPO) Office Action for Korean Patent Application No. 10-2006-7000476 dated Jun. 19, 2007.
Supplementary European Search Report dated Nov. 2, 2007 for European Patent Application 02807020.9.
Office Action from the Korean Intellectual Property Office for Korean Patent Application No. 10-2006-7000476 dated Feb. 19, 2008.
http://web.archive.org/web/20030507193839/http:snf.sanford.edu/Process/Lithography/liftoff.html, edited Aug. 14, 2000.
Third Office Action dated Aug. 1, 2008 from the Chinese Patent Office for Chinese Patent Application No. 02827708.2 (PCT/US02/37184).
First Office Action dated Aug. 10, 2008 from the Japanese Patent Office for Japanese Patent Application No. 2005-508477 (PCT/US03/38743).
Yang et al., "Magnetic Nanowire Based High Resolution Magnetic Force Microscope Probes", Applied Physics Letter 87 (2005).
Hartmann, U., "Magnetic Force Microscopy", Annu, Rev. Mater. Sci. 1999. 29: p. 53-87.
J.H. Hafner et al., "Structural and Functional Imaging with Carbon Nanotube AFM Probes", Progress in Biophysics & Molecular Biology, 2001. 77: p. 73-110.
T. Larsen et al., "Comparison of Wear Characteristics of Etched-Silicon and Carbon Nanotube Atomic-Force Microscopy Probes", Appl. Phys. Lett., 2002. 80(11): p. 1996-1998.
T. Arie et al., "Carbon-nanotube probe equipped magnetic force microscope", J. Vac. Sci. Technol. B., 2002. 18: p. 104.
H. Cui et al., "Growth of Carbon Nanofibers on Tipless Cantilevers for High Resolution Topography and Magnetic Force Imaging", Nano Letters, 2004. 4(11): p. 2157-2161.
H. Kuramochi et al., "A Magnetic Force Microscope Using CoFe-Coated Carbon Nanotube Probes", Nanotechnology, 2005. 16: p. 24-27.
Z. Deng et al., "Metal-Coated Carbon Nanotube Tips for Magnetic Force Microscopy", Applied Physics Letter, 2004. 85(25): p. 6263.
Jones, T.B., "Electromechanics of Particles", 1995. Cambridge: Cambridge Univ. Press. pp. 34-49.
Jie Tang et al., "Rapid and Reproducible Fabrication of Carbon Nanotube AFM Probes by Dielectrophoresis", Nano Letters, "in press".
R. Stevens et al., "Improved fabrication approach for carbon nanotube probe devices", Appl. Phys. Lett., vol. 77, No. 21, Nov. 20, 2000, pp. 3453-3455.
J. Hafner et al., "Growth of nanotubes for probe microscopy tips", Nature, vol. 398, Apr. 29, 1999, pp. 761-762.
H. Dai et al., "Nanotubes as nanoprobes in scanning probe microscopy". Nature, vol. 384, Nov. 14, 1996, pp. 147-150.
Office Action Restriction Requirement dated Aug. 8, 2003 for U.S. Appl. No. 09/996,695.
Office Action-non final action dated Dec. 1, 2003 for U.S. Appl. No. 09/996,695.
Office Action-final action dated May 26, 2004 for U.S. Appl. No. 09/996,695.
Office Action-non final action dated Feb. 17, 2005 for U.S. Appl. No. 09/996,695.
Notice of Allowance dated Apr. 3, 2007 for U.S. Appl. No. 09/996,695.
Office Action-non final action dated Mar. 28, 2008 for U.S. Appl. No. 10/842,357.
Office Action Restriction Requirement dated Jan. 4, 2005 for U.S. Appl. No. 10/730,068.
Office Action-non final action dated Apr. 21, 2005 for U.S. Appl. No. 10/730,068.
Notice of Allowance dated Oct. 12, 2005 for U.S. Appl. No. 10/730,068.
Office Action from Japanese Patent Office for Japanese Patent Application No. 2003-573718 dated Jun. 16, 2008.

* cited by examiner

500μ

DEPOSITION METHOD FOR NANOSTRUCTURE MATERIALS

This application is a continuation-in-part of U.S. patent application Ser. No. 09/996,695, filed 11/30/2001 now published as U.S. Patent Application Publication No. US 2003/0102222, the content of which is incorporated herein by reference, in its entirety. Applicants claim full rights and benefits afforded by the previously disclosed subject matter pursuant to 35 U.S.C. §120.

STATEMENT REGARDING FEDERALLY SPONSORED RESEARCH OR DEVELOPMENT

At least some aspects of this invention were made with Government support under contract No. N00014-98-1-0597 and NAG-1-01061. The Government may have certain rights in this invention.

FIELD OF THE INVENTION

The present invention relates to methods of depositing a nanostructure or nanotube-containing material onto a substrate at predetermined locations, and associated structures and devices.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

The term "nanostructure" material is used by those familiar with the art to designate materials including nanoparticles such as $C_{60}$ fullerenes, fullerene-type concentric graphitic particles; nanowires/nanorods such as Si, Ge, $SiO_x$, $GeO_x$, or nanotubes composed of either single or multiple elements such as carbon, $B_xN_y$, $C_xB_yN_z$, $MoS_2$, and $WS_2$. One of the common features of nanostructure materials is their basic building block. A single nanoparticle or a carbon nanotube has a dimension that is less than 500 nm at least in one direction. These types of materials have been shown to exhibit certain properties that have raised interest in a variety of applications and processes.

U.S. Pat. No. 6,280,697 to Zhou et al. (entitled "Nanotube-Based High Energy Material and Method"), the disclosure of which is incorporated herein by reference, in its entirety, discloses the fabrication of carbon-based nanotube materials and their use as a battery electrode material.

U.S. Pat. No. 6,630,772 (Ser. No. 09/296,572 entitled "Device Comprising Carbon Nanotube Field Emitter Structure and Process for Forming Device") the disclosure of which is incorporated herein by reference, in its entirety, discloses a carbon nanotube-based electron emitter structure.

U.S. patent application Ser. No. 09/351,537 entitled "Device Comprising Thin Film Carbon Nanotube Electron Field Emitter Structure", the disclosure of which is incorporated herein by reference, in its entirety, discloses a carbon-nanotube field emitter structure having a high-emitted current density.

U.S. Pat. No. 6,277,318 to Bower et al. (entitled "Method for Fabrication of Patterned Carbon Nanotube Films"), the disclosure of which is incorporated herein by reference, in its entirety, discloses a method of fabricating adherent, patterned carbon nanotube films onto a substrate.

U.S. Pat. No. 6,334,939 (Ser. No. 09/594,844 entitled "Nanostructure-Based High Energy Material and Method"), the disclosure of which is incorporated herein by reference, in its entirety, discloses a nanostructure alloy with alkali metal as one of the components. Such materials are described as being useful in certain battery applications.

U.S. Pat. No. 6,553,096 entitled "X-Ray Generating Mechanism Using Electron Field Emission Cathode", the disclosure of which is incorporated herein by reference, in its entirety, discloses an X-ray generating device incorporating a nanostructure-containing material.

U.S. Pat. No. 6,965,199 (Ser. No. 09/817,164 entitled "Coated Electrode With Enhanced Electron Emission And Ignition Characteristics") the disclosure of which is incorporated herein by reference, in its entirety, discloses an electrode including a first electrode material, an adhesion-promoting layer, and a carbon nanotube-containing material disposed on at least a portion of the adhesion promoting layer, as well as associated devices incorporating such an electrode.

U.S. Pat. No. 6,787,122 (Ser. No. 09/881,684 entitled "Method of Making Nanotube-Based Material With Enhanced Field Emission") the disclosure of which is incorporated herein by reference, in its entirety, discloses a technique for introducing a foreign species into the nanotube-based material in order to improve the emission properties thereof.

As evidenced by the above, nanostructure materials, such as carbon nanotubes possess promising properties, such as electron field emission characteristics which appear to be far superior to that of conventional field emitting materials. In particular, carbon-nanotube materials exhibit low emission threshold fields as well as large emission current densities. Such properties make them attractive for a variety of microelectronic applications, such as lighting elements, field emission flat panel displays, gas discharge tubes for over voltage protection, and x-ray generating devices.

However, the effective incorporation of such materials into these devices has been hindered by difficulties encountered in the processing of such materials. For instance, carbon nanotubes are produced by techniques such as laser ablation and arc discharge methods. Both techniques require very high reaction temperatures. Carbon nanotubes produced by such techniques are collected, subjected to further processes (e.g.—filtration and/or purification) and subsequently deposited or otherwise incorporated into the desired device. Thus, according to these conventional techniques, it is not possible to directly form carbon nanotubes onto a substrate or carrier material.

Post-formation methods such as screen printing and spraying have been utilized to deposit pre-formed carbon nanotubes on a substrate. However, such techniques pose certain drawbacks. For instance, screen printing requires the use of binder materials as well as an activation step. Screen printing also suffers from low resolution and inefficient use of materials. Spraying can be inefficient and is not practical for large-scale fabrication.

Carbon nanotubes have been grown directly upon substrates by use of chemical vapor deposition (CVD) techniques. However, such techniques require relatively high temperatures (e.g. ~600-1,000° C.) as well as reactive environments in order to effectively grow the nanotubes. In most cases, they also require selective deposition of catalysts before nanotube growth. The requirement for such harsh environmental conditions severely limits the types of substrate materials which can be utilized. In addition, the CVD technique often results in multi-wall carbon nanotubes. These multi-wall carbon nanotubes generally do not have the same level of structural perfection and thus have inferior electronic emission properties when compared with single-walled carbon nanotubes.

Thus, there is a need in the art to address the above-mentioned disadvantages, and others, associated with conventional fabrication techniques.

SUMMARY OF THE INVENTION

The present invention addresses the above-mentioned disadvantages associated with the state of the art, and others.

For example, the present invention provides a process for depositing preformed nanostructure material, such as carbon nanotubes, onto a substrate material at predetermined locations utilizing electrophoretic deposition. The liquid-phase deposition process is efficient and affords high resolution.

According to one aspect, the present invention provides a method of depositing a nanostructure-containing material onto a substrate, the method comprising: (1) forming a solution or suspension of containing the nanostructure material; (2) masking at least a portion of at least one surface of the substrate (3) immersing electrodes in the solution, the substrate upon which the nanostructure material is to be deposited acting as one of the electrodes or is electrically connected to at least one electrode; (4) applying a direct and/or alternating current electrical field between the two electrodes for a certain period of time thereby causing the nanostructure materials in the solution to migrate toward and attach themselves to the substrate electrode; (5) removing the mask while leaving the nanostructure; (6) subsequent optional processing.

According to another aspect, the present invention provides a method of fabricating a patterned electron field emission cathode comprising a substrate coated with pre-formed carbon nanotube-containing material, the method comprising: (i) preparing a stable liquid suspension or solution containing the preformed carbon nanotube materials; (ii) depositing a layer of insoluble photoresist on the surface of the substrate; (iii) patterning the photoresist such that openings are formed in the photoresist layer corresponding to areas on the substrate onto which carbon nanotube-containing material is to be deposited; (iv) inserting two electrodes into the said liquid where the said substrate is, or is electrically connected to, one of the two electrodes and applying an electrical field between the two electrodes such that the carbon nanotube-containing material is deposited on the surface of the said substrate corresponding to the openings in the photoresist layer; (v) removing the photoresist layer from the substrate; and (vi) further optional processing.

According to another aspect, the present invention provides a method of fabricating a patterned electron field emission cathode comprising a substrate coated with pre-formed carbon nanotube-containing material, the method comprising: (i) preparing a stable liquid suspension or solution containing the preformed carbon nanotube materials; (ii) depositing a release layer on the surface of the substrate; (iii) depositing a layer of insoluble photoresist on the surface of the release layer; (iv) patterning the photoresist and the exposed release layer such that openings are formed in the photoresist and the release layer corresponding to areas on the substrate onto which carbon nanotube-containing material is to be deposited; (v) inserting two electrodes into the liquid where the substrate is, or is electrically connected to, one of the two electrodes and applying an electrical field between the two electrodes such that the carbon nanotube-containing material is deposited on the surface of the substrate corresponding to the openings in the photoresist layer; (v) removing the release and the photoresist layer from the substrate; and (vi) further processing The substrates can be a variety of materials including glass coated with a layer of conducting materials such as indium-tin-oxide, silver paste or metal, silicon, metal, polymer, ceramic. The coating materials can contain nanostructure-containing materials or a mixture of nanostructure-containing materials and additives that can enhance the properties such as the field emission properties of the coating. The film can have a single layer structure with either nanostructure-containing materials or a mixture of nanostructure-containing materials and the additives, or a multilayer structure with one of the layers having the nanostructure-containing materials.

One application of the disclosed processes is fabrication of patterned carbon nanotube field emission cathodes for field emission display devices. The liquid phase process enables high resolution and efficient fabrication of carbon nanotube field emission cathodes with predetermined patterns. It has no intrinsic limit on the size of the cathodes can be fabricated.

BRIEF DESCRIPTION OF THE DRAWING FIGURES

DETAILED DESCRIPTION OF THE INVENTION

Figure 1A:
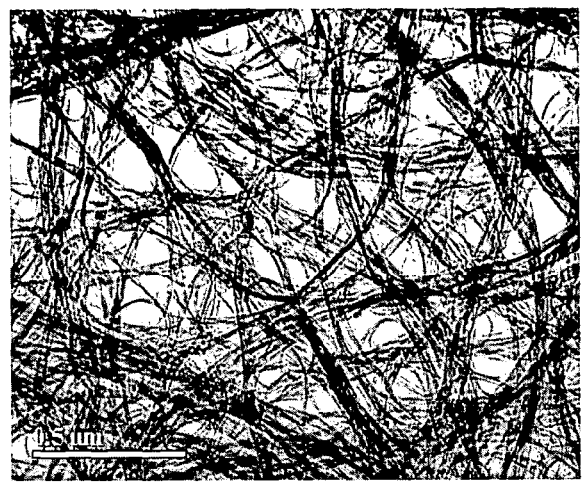
FIG. 1A is a transmission electron microscopic (TEM) image of purified single walled carbon nanotube bundles.

A method performed consistent with the principles of the present invention, and according to a preferred embodiment, along with corresponding structures and devices, are described as follows.

Generally, a method performed according to the principles of the present invention can include a combination of some or all of the following steps: (1) forming a solution or suspension containing the nanostructure material; (2) selectively adding "chargers" to the solution; (3) applying a mask to a substrate upon which the nanostructure material is to be deposited; (4) immersing electrodes in the solution, the substrate upon which the nanostructure material is to be deposited acting as one of the electrodes; (5) applying a direct and/or alternating current thus creating an electrical field between the electrodes for a certain period of time thereby causing the nanostructure materials in the solution to migrate toward and attach themselves to the substrate electrode; (6) removing the mask; and (7) subsequent processing of the coated substrate.

The process begins with pre-formed raw nanostructure or nanotube-containing material, such as a carbon nanotube-containing material. This raw nanotube material can comprise at least one of single-walled carbon nanotubes, double-walled carbon nanotubes, or small-diameter multi-walled carbon nanotubes.

The raw carbon-containing material can be fabricated according to a number of different techniques familiar to those in the art. For example, the raw carbon nanotube-containing material can be fabricated by laser ablation techniques (e.g.—see U.S. Pat. No. 6,280,697), chemical vapor deposition techniques (see, e.g.—C. Bower et al., "Plasma Induced Conformal Alignment of Carbon Nanotubes on Curvatured Surfaces," Appl Phys Lett. Vol. 77, No. 6, pgs. 830-32 (2000)), or arc-discharge techniques (see, e.g.—C. Journet et al., Nature, Vol. 388, p. 756 (1997)).

It is also contemplated by the present invention that raw materials be in the form of nanotube structures with a composition of $B_xC_yN_z$ (B=boron, C=carbon, and N=nitrogen), or nanotube or concentric fullerene structures with a composition $MS_2$ (M=tungsten, molybdenum, or vanadium oxide) can be utilized. These raw materials can be formed by any suitable technique, such as the above-mentioned arc-discharge technique.

It is also within the scope of the present invention that the raw materials are in the form of nanowires with at least one of the following: elemental metal, Si, Ge, oxide, carbide, nitride, chalcogenide. In addition, the raw materials can be in the form of nanoparticles of elemental metal, metal oxide, elemental and compound semiconducting materials.

In some cases, the raw carbon nanotube-containing material is subjected to purification. A number of techniques for purifying the raw materials are envisioned. According to one preferred embodiment, the raw material can be purified by reflux in a suitable solvent, such as a combination of peroxide ($H_2O_2$) and water, with an $H_2O_2$ concentration of 1-40% by volume, preferably about 20% by volume $H_2O_2$, with subsequent rinsing in $CS_2$ and then in methanol, followed by filtration. According to an exemplary technique, approximately 10-100 ml of peroxide is introduced into the medium for every 1-10 mg of nanotubes in the medium, and the reflux reaction is carried out at a temperature of 20-100° C. (see, e.g.—U.S. Pat. No. 6,553,096.

According to another alternative, the raw carbon nanotube-containing material is placed in a suitable liquid medium, such as an acidic medium, an organic solvent, or an alcohol, preferably methanol. The nanotubes are kept in suspension within the liquid medium for several hours using a high-powered ultrasonic horn, while the suspension is passed through a microporous membrane. In another embodiment, the raw materials can be purified by oxidation in air or an oxygen environment at a temperature of 200-700° C. The impurities in the raw materials are oxidized at a faster rate than the nanotubes.

In yet another embodiment, the raw materials can be purified by liquid chromatography to separate the nanotubes/nanowires from the impurities.

The raw material is then optionally subjected to further processing to shorten the nanotubes and nanotube bundles, such as chemical etching.

According to one embodiment, the purified carbon nanotube material can be subjected to oxidation in a strong acid. For instance, purified carbon nanotube material can be placed in an appropriate container in a solution of acid comprising $H_2SO_4$ and $HNO_3$. The carbon nanotubes in solution are then subjected to sonication for an appropriate length of time. After sonication, the processed nanotubes are collected from the acid solution by either filtration or centrifuging after repeated dilution with de-ionized water. Such processing can also render the material hydrophilic.

Figure 1B:
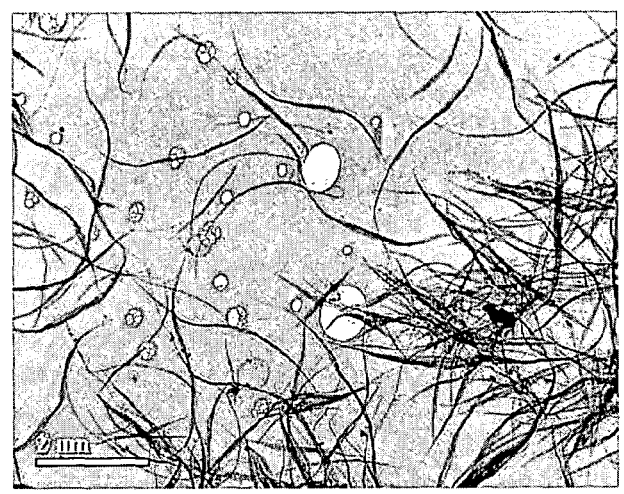
FIG. 1B is a TEM image of single walled carbon nanotubes etched to a 4 micron average bundle length.
Figure 1C:
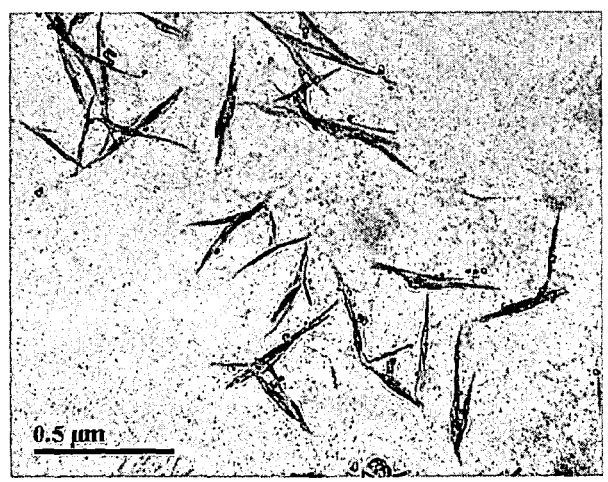
FIG. 1C is a TEM image of single walled carbon nanotubes etched to a 0.5 micron average bundle length.

An illustrative example of such a process is described as follows. Purified raw material formed as described above was found to contain approximately 90% single-walled nanotube bundles over 10 μm in length and 5-50 nm in bundle diameter. Such "long" nanotube bundles are illustrated by FIG. 1A. This material was chemically etched in a solution of $H_2SO_4$ and $HNO_3$ for 10-24 hours while being subjected to ultrasonic energy. After etching the single wall carbon nanotube bundles etched for 20 hours had an average length of 4 μm and the single wall carbon nanotube bundles etched for 24 hours had an average bundle length of 0.5 μm, as shown by the transmission electron microscopy images in FIGS. 1B-1C. Alternatively, the purified materials can be chemically functionalized by, for example, chemically or physically attaching chemical species to the outer surfaces of the carbon nanotubes such that they will be either soluble or form stable suspensions in certain solvents.

According to another alternative, the purified raw material can be shortened by mechanical milling. According to this technique, a sample of the purified carbon nanotube material is placed inside a suitable container, along with appropriate milling media. The container is then shut and placed within a suitable holder of a ball-milling machine. According to the present invention, the time that the sample is milled can vary. An appropriate amount of milling time can be readily determined by inspection of the milled nanotubes.

Regardless of the technique utilized, the preferred length of the shortened material, such as the above-mentioned nanotubes and nanotube bundles, is approximately 0.1-100 micrometers, preferably 1.0-10 micrometers.

The purified raw material, regardless of whether subjected to the above-described shortening process, can also optionally be annealed at a suitable temperature. According to a preferred embodiment, the annealing temperature is 100° C.-500° C. The material is annealed for a suitable time period, such as approximately 1 to 60 minutes. According to a preferred embodiment, the material is annealed for approximately 1 hour. The material is annealed in a vacuum of about $10^{-2}$ torr, or at an even higher vacuum pressure. According to a particular embodiment, the vacuum is about $5 \times 10^{-7}$ torr.

The above described "raw" or pre-formed material can now be introduced into a solution for deposition onto a substrate.

A suitable liquid medium is selected which will permit the formation of a stable suspension of the raw nanostructure material therein. According to a preferred embodiment the liquid medium comprises at least one of water, methanol, ethyl alcohol, or isopropyl alcohol. According to a further preferred embodiment, the liquid medium comprises ethyl alcohol or isopropyl alcohol. Upon adding the raw material to the liquid medium, the mixture can optionally be subjected to ultrasonic energy or stirring using, for example, a magnetic stirrer bar, in order to facilitate the formation of a stable suspension. The amount of time that the ultrasonic energy is applied can vary, but it has been found that approximately two hours at room temperature is sufficient.

The concentration of raw material in the liquid medium can be varied, so long as a stable suspension is formed. The concentration can range from 0.01-100 mg/L, preferably 0.1-10 mg/L. For example, with ethyl alcohol as the liquid medium, approximately 1 mg of the raw material, such as single-walled carbon nanotubes, can be present per liter of the liquid medium (1 mg/L) and provide a stable suspension. When shortened carbon nanotubes are used, stable suspension can be obtained at a higher concentration.

According to a preferred embodiment, a "charger" is added to the suspension in order to facilitate electrophoretic deposition. One such preferred charger is $MgCl_2$. Some other chargers include $Mg(NO_3)_2$, $La(NO_3)_3$, $Y(NO_3)_3$, NaOH, and $AlCl_3$. Any suitable amount can be utilized. Amounts ranging from less than 1% up to 50%, by weight, as measured relative top to the amount of nanostructure-containing material, are feasible. According to a preferred embodiment, the suspension can contain less than 1% of the charger. According to another preferred embodiment, $MgCl_2$ is added at a concentration of 0.001-1g/L, preferably 0.005-0.1 g/L.

A plurality of electrodes are then introduced into the suspension. According to a preferred embodiment, two electrodes are utilized. One of the electrodes comprises the substrate upon which the nanostructure material is to be deposited, or is electrically connected thereto. Any suitable substrate material is envisioned, so long as it possesses the requisite degree of electrical conductivity, such as a conductor or semiconductor. Specific examples include indium-tin-oxide-coated glass, polymers, silicon or metal.

An alternating current, or a direct current is applied to the electrodes thereby producing an electrical field between the electrodes. This causes the nanostructure material in the suspension to migrate toward and attach to the substrate electrode. According to one embodiment, the electrical field applied between electrodes is 0.1-1000 V/cm, preferably 5-100V/cm and a direct current of 0.1-200 mA/cm$^2$ is applied for 1 second-1 hour.

Figure 2:
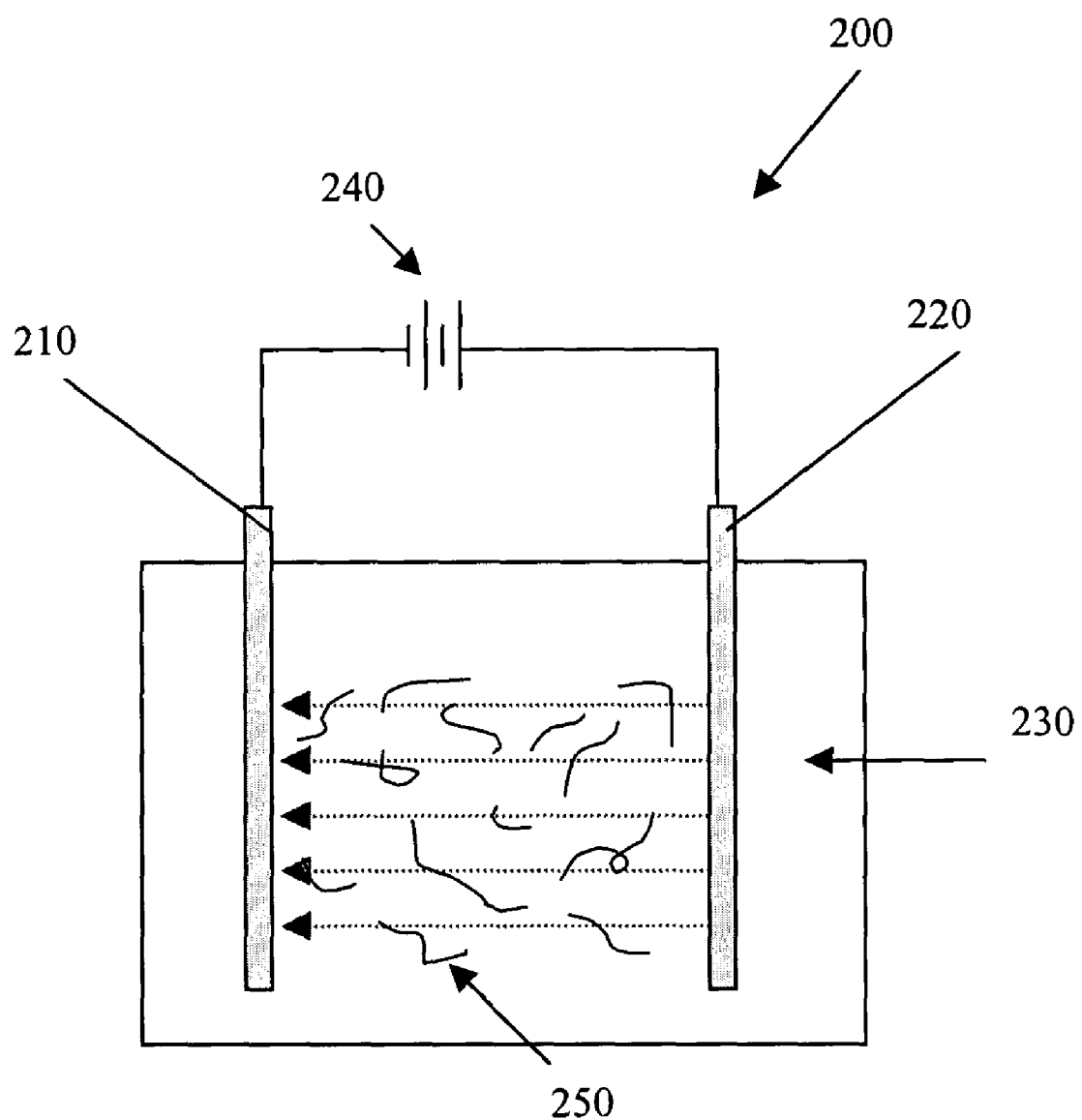
FIG. 2 is a schematic illustration of an electrophoretic deposition process according to the principles of the present invention.

FIG. 2 is a schematic illustration of the above-described arrangement and process. As illustrated in FIG. 2, the process or arrangement 200 includes a pair of electrodes 210 and 220 are introduced into the suspension 230 formed as described above. The electrodes 210 and 220 are connected to a power supply 240, which produces an electrical field between electrodes 210, 220. Depending on the charge of the nanostructure material 250 contained in the suspension 230, the nanostructure material 250 will migrate toward and attach to one of the electrodes 210, 220 thereby forming a coating of the nanostructure material on one of the electrodes 210, 220. In the illustrative example, the substrate is the negative electrode 210, or anode.

According to a preferred embodiment, the above-described electrophoretic deposition is carried out at room temperature.

The rate of deposition of the coating, as well as its structure and morphology can be influenced by many factors. Such factors include: the concentration of nanostructure material in the suspension 230, the concentration of the charger material (e.g.—$MgCl_2$) in the suspension 230, the conductivity of the substrate, and control of the power source 240.

Figure 3A:
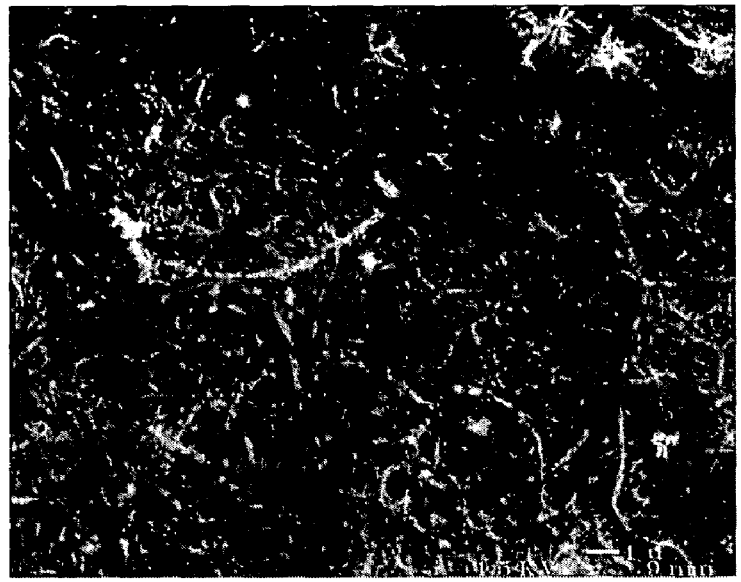
FIG. 3A is a scanning electron microscope (SEM) image of a coating of "long" single-walled carbon nanotubes onto a substrate according to the principles of the present invention.

By way of illustration, a stainless steel substrate/electrode and a counter electrode were introduced into a suspension comprising dimethylformamide and single-walled carbon nanotubes at a concentration of 0.4 mg/ml, and $MgCl_2$. A direct current was applied resulting in an electrical field of approximately 20 V/cm formed between the electrodes. Application of the current for about 30 seconds results in the formation of a smooth film of single-walled carbon nanotubes on the substrate. After application of direct current for approximately 10 minutes, a thin film of single-walled carbon nanotubes approximately 1 micrometer thick was deposited on the substrate. This film was examined using a scanning electron microscope, and is illustrated in FIG. 3A. The morphology of the deposited coating or film is similar to that of coating or film applied by spraying, and comprises clearly defined single-walled carbon nanotube bundles.

Figure 3B:
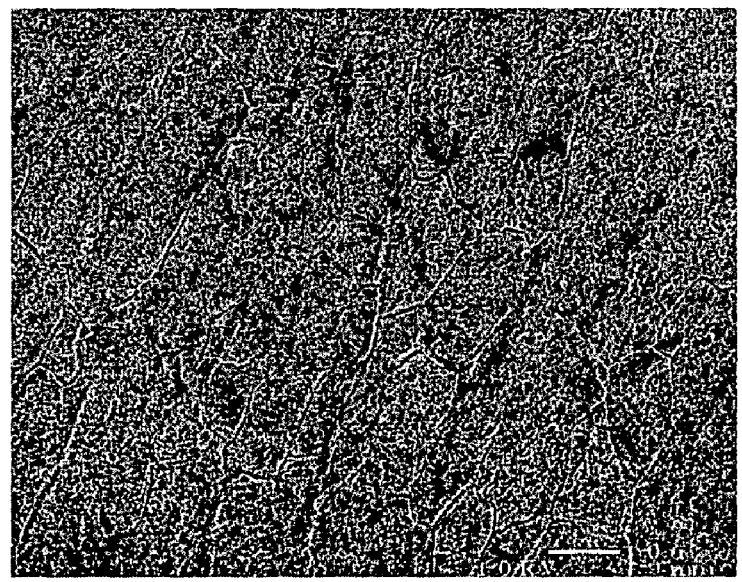
FIG. 3B is a SEM image of a coating of "short" single-walled carbon nanotubes onto a substrate according to the principles of the present invention.

FIG. 3B is a SEM image of a coating of single-walled carbon nanotube bundles deposited by electrophoretic deposition in the manner described above. However, the nanotubes were subjected to a previously described process to shorten their length (e.g.—to about a 0.5 μm average bundle length). The film depicted in FIG. 3 was densified by sintering in vacuum at a suitable temperature (e.g.—800° C.). This coating comprises distinct grain boundaries with densely packed grains. Individual single-walled carbon nanotube bundles are no longer discernable.

The particular electrode (i.e.—anode or the cathode) to which the nanostructure material migrates can be controlled through the selection of the charger material. For example, the use of a "negative" charger, such as sodium hydroxide (NaOH) imparts a negative charge to the nanostructure material, thereby creating a tendency for the nanostructure material to migrate towards the positive electrode (cathode). Conversely, when a "positive" charger material is used, such as $MgCl_2$, a positive charge is imparted to the nanostructure material, thereby creating a tendency for the nanostructure material to migrate toward the negative electrode (anode).

The electrodes are removed from the suspension after a suitable deposition period. The coated substrate electrode may optionally be subjected to further processing. For example, the coated substrate may be annealed to remove the liquid medium. Such an annealing procedure may be preferable, since removal of impurities such as residual suspension medium improves the emission characteristics of the nanostructure material. By way of example, the coated substrate can be heated to a temperature of approximately 100-1200° C. for approximately 1 hour, and then at approximately 800° C. for 2 hours, both at a vacuum of approximately $5 \times 10^{-7}$ torr.

The coating of nanostructure materials deposited according to the principles of the present invention exhibit better adhesion that a similar coatings applied by other techniques such as spraying. While not wishing to be limited by any particular theory, the improved adhesion may be due to the formation of metal hydroxide on the surface of the substrate (formed from metal ions of the electrode and OH groups from the charger). The films formed according to the principles of the present invention also exhibit improved field emission stability (i.e.—higher resistance to field emission decay).

According to a further embodiment, the adhesion of nanotubes to the substrate can be further improved by incorporation of adhesion promoting materials such as glass frits, binders, carbon-dissolving or carbide-forming metal and further annealing. These materials can be introduced by, for example, one of the following processes: co-deposition of the nanostructures and particles of adhesion promoting materials, sequential deposition, pre-deposition of a layer of adhesion promoting materials, etc.

In one embodiment, binders such as polymer binders are added to the suspension of the nanostructure-containing material which is then either stirred or sonicated to obtain a uniform suspension. Suitable polymer binders include poly (vinyl butyral-co vinyl alcohol-co-vinyl acetate) and poly (vinylidene fluoride). Suitable chargers are chosen such that under the applied electrical field, either DC or AC, the binder and the nanostructures would migrate to the same electrodes to form a coating with an intimate mixing of the nanostructures and the binder.

In another embodiment, small glass particles, small metal oxide particles, or small metal particles such as titanium, iron, lead, tin, cobalt are mixed into the suspension of the nanostructure-containing material.

Suitable chargers are chosen such that under the applied electrical field, the metal particles when present, and the nanostructures will migrate to the desired electrode to form a uniform coating with an intimate mixing of the metal particles and the nanostructures. After deposition, the coated substrate is annealed in vacuum with a base vacuum pressure of $10^{-3}$ torr or greater for 0.1-10 hours. Preferably, the diameter of the particles is smaller than 1 micrometer.

The binders or adhesion promoting materials can be added in any suitable amount. Amounts ranging from 0.1-20% by weight, measured relative to the amount of nanostructure-containing material is envisioned.

In another embodiment, the substrate to be coated with the nanostructures is first coated with at least one layer of adhesion-promoting metal such as titanium, iron, lead, tin, cobalt, nickel, tantalum, tungsten, niobium, zirconium, vanadium, chromium or hafnium. The layer can be applied by techniques such as electrochemical plating, thermal evaporation, sputtering or pulsed laser deposition. After electrophoretic deposition of the nanostructures, the film is annealed in vacuum with a base vacuum pressure of $10^{-3}$ torr or greater for 0.1-10 hours.

Thus, the above-described processes are advantageously well-adapted for high output and automation. These processes are very versatile and can be used to form uniform coatings of various thicknesses (e.g.—tens of nanometers to a few micrometers thick), coatings on complex shapes, as well as complicated structures such as composites and "gated" electrodes. The methods of the present invention are useful in producing nanotube materials which have properties that make them beneficial for use in a number of different applications. Generally, the method of the present invention is especially beneficial in providing nanotube material for incorporation into electron field emission cathodes for devices such as x-ray generating devices, gas discharge tubes, lighting devices, microwave power amplifiers, ion guns, electron beam lithography devices, high energy accelerators, free electron lasers, electron microscopes and microprobes, and flat panel displays.

The electrophoresis method of the present invention can used to coat substrates with composite layers in which nanostructured materials serve as one of the components. It can also be utilized to form multilayered structures on a supporting surface.

To deposit a composite layer containing nanostructure-containing material on a substrate, nanostructured materials and at least one more component (e.g.—polymer or metal particles) are suspended in a liquid medium to make up the electrophoresis bath. After selectively adding a "charger" to the suspension, two electrodes, wherein at least one of the electrodes comprises the substrate, or is electrically connected to the substrate, are immersed in the suspension and a direct or alternating current is applied to the immersed electrodes thereby creating an electrical field between the electrodes. Because the nanostructured materials and the other component in the suspension are charged by the same "charger", they would migrate toward and attach to the same substrate simultaneously under the same electrical field. In the above-described method, the composition of deposited composite layer is mostly decided by the composition of the suspension in which the electrophoresis has been carried out. Therefore, composite layers having different compositions can be readily obtained by immersing a substrate in baths with different compositions and performing the above-described electrophoretic deposition.

While a composite layer can be made by electrophoresis using only one bath, multiple baths can be used to produce a multilayered electrophoretic deposition. The electrophoresis is carried out in each bath sequentially with each bath producing a layer of different composition in the multilayered structure. When the desired thickness of a layer is reached, the deposition electrode can be moved to the next suspension for deposition of the next layer.

Figure 4:
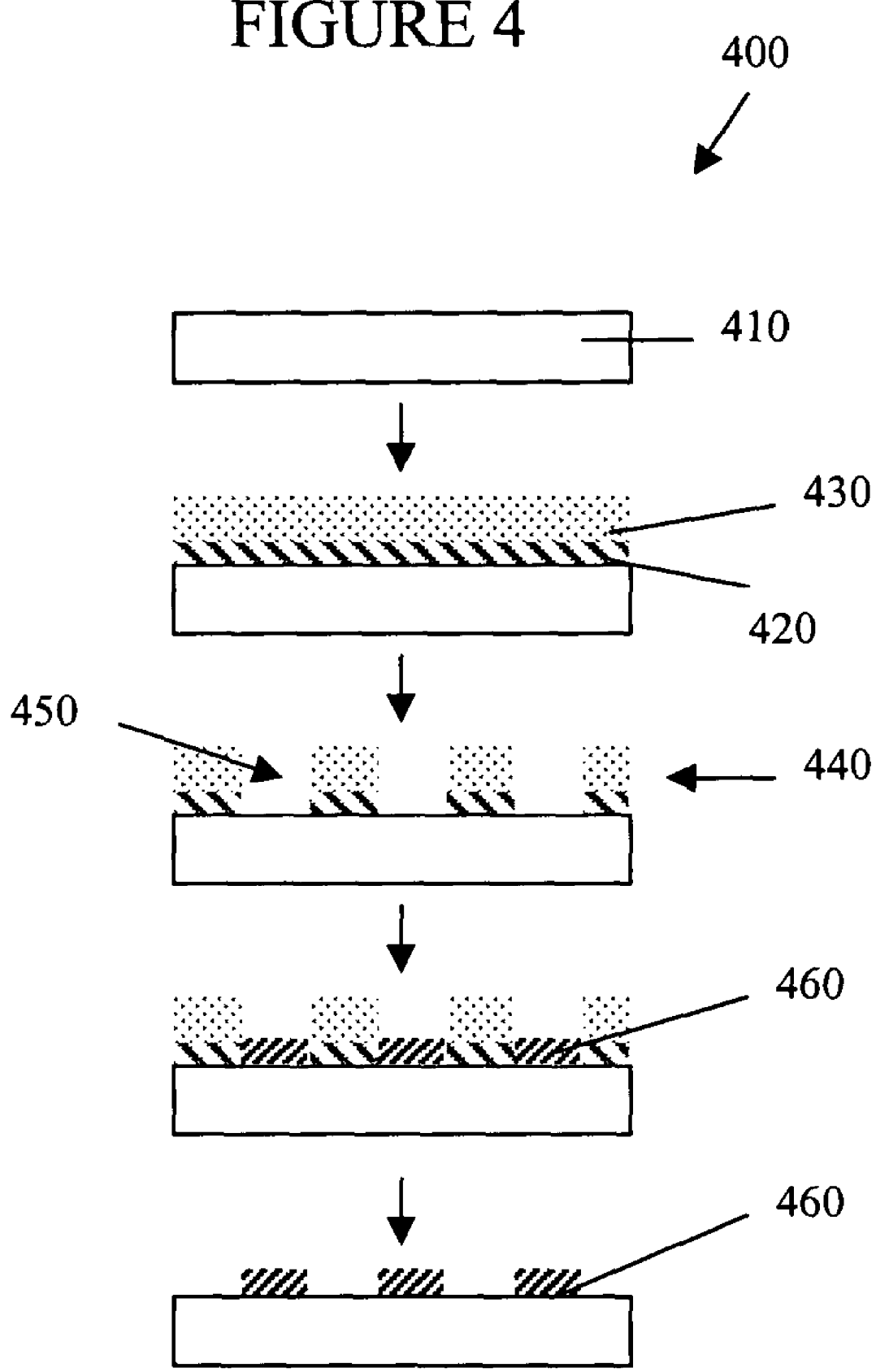
FIG. 4 is a schematic illustration of a process performed according to one embodiment of the present invention.

One embodiment of a process performed according to the above-described principles is illustrated in FIG. 4. The method 400 generally includes a substrate 410 formed from any of the above-described materials, upon which a release layer 420 and a photoresist layer 430 are applied.

The substrate 410 can comprise indium-tin-oxide coated glass, glass coated with a conductive paste, metal-coated glass, metal, a polymer, or a Si wafer. The release layer 420 is selected from a variety of suitable materials. For example, the release layer 420 can be formed from a material that can be dissolved by selected solvents. One non-limiting example of such a release layer material is OmniCoat™ (commercially available from MicroChem, Inc.).

The photoresist layer 430 can comprise any suitable material. One such material is insoluble in alcohol, such as a negative epoxy-based photoresist material. One non-limiting example of a suitable photoresist material is SU-8 photoresist (commercially available from MicroChem, Inc.).

The photoresist layer 430 and the release layer 420 are selectively removed thereby leaving a pattern 440 with openings 450 disposed therein. The removal of both layers can be accomplished by any suitable technique. For example, the photoresist layer can be removed by contact mode UV lithography techniques. Such techniques generally involve masking the photoresist material with a mask having openings which expose the underlying photoresist structure to UV light, which in turn cross-links those areas of the photoresist exposed by the mask, subsequent optional processing to enhance cross-linking (e.g.—heating above the glass-transition temperature of the photoresist), and removal of the non-crosslinked areas of the photoresist (e.g.—by application of a "developer" chemical or solvent). The release layer can be removed by suitable mechanical or chemical means. For example, the release layer can be removed by exposure to a selected solvent.

At least one layer of nanostructure-containing material 460 is deposited onto the substrate 410 at those areas corresponding to the openings 450. The at least one nanostructure-containing layer 460 can comprise any of the previously described nanostructure materials. The layer may also contain and of the aforementioned additives. The at least one layer 460 can also comprise a plurality of distinct individual layers.

The at least one layer 460 can be applied by any suitable technique, such as spin coating, spraying, casting, printing and electrophoretic deposition. According to one preferred embodiment, the at least one layer 460 is formed by electrophoretic deposition. According to a non-limiting example, a solution or suspension is formed with 0.01-100 mg of carbon nanotubes per liter of a suitable solvent, such as ethyl alcohol or isopropyl alcohol. Two electrodes are then placed into the suspension or solution, and a direct current voltage of 1-100 V/cm is applied thereto for a period of 0.01-30 minutes.

The deposition process can be repeated in the same or different solution(s) or suspension(s) thereby forming a multi-layer structure.

Once deposited, the layer 460 can be optimally processed to promote adherence to the substrate 410. For example, the at least one layer 460 is subjected to a suitable annealing step, as previously described.

The remaining release layer 420 and photoresist layer 430 is removed from the substrate 410 by any suitable means. For example, the release layer 420 can be removed by mechanical or chemical means thereby removing the photoresist layer 430 as well.

The coated substrate can also be subjected to a number of optional additional processing steps. Such steps may include one or more of the following: rinsing, annealing, removal of excess nanostructures, and activating the nanostructures contained in the at least one layer.

The optional activation step can be accomplished via one or more of: sonication, rubbing, tapping, brushing, blowing, plasma treatment, and application of an electrical field in a vacuum or under a partial oxygen pressure to promote alignment of the nanostructures.

The above-described process 400 is capable of high-resolution deposition of nanostructure-containing material formations. For example, the dimensions of the individual deposits can be on the order of 1 μm, and the thickness thereof can range from 1 nm-10 μm.

Figure 5:
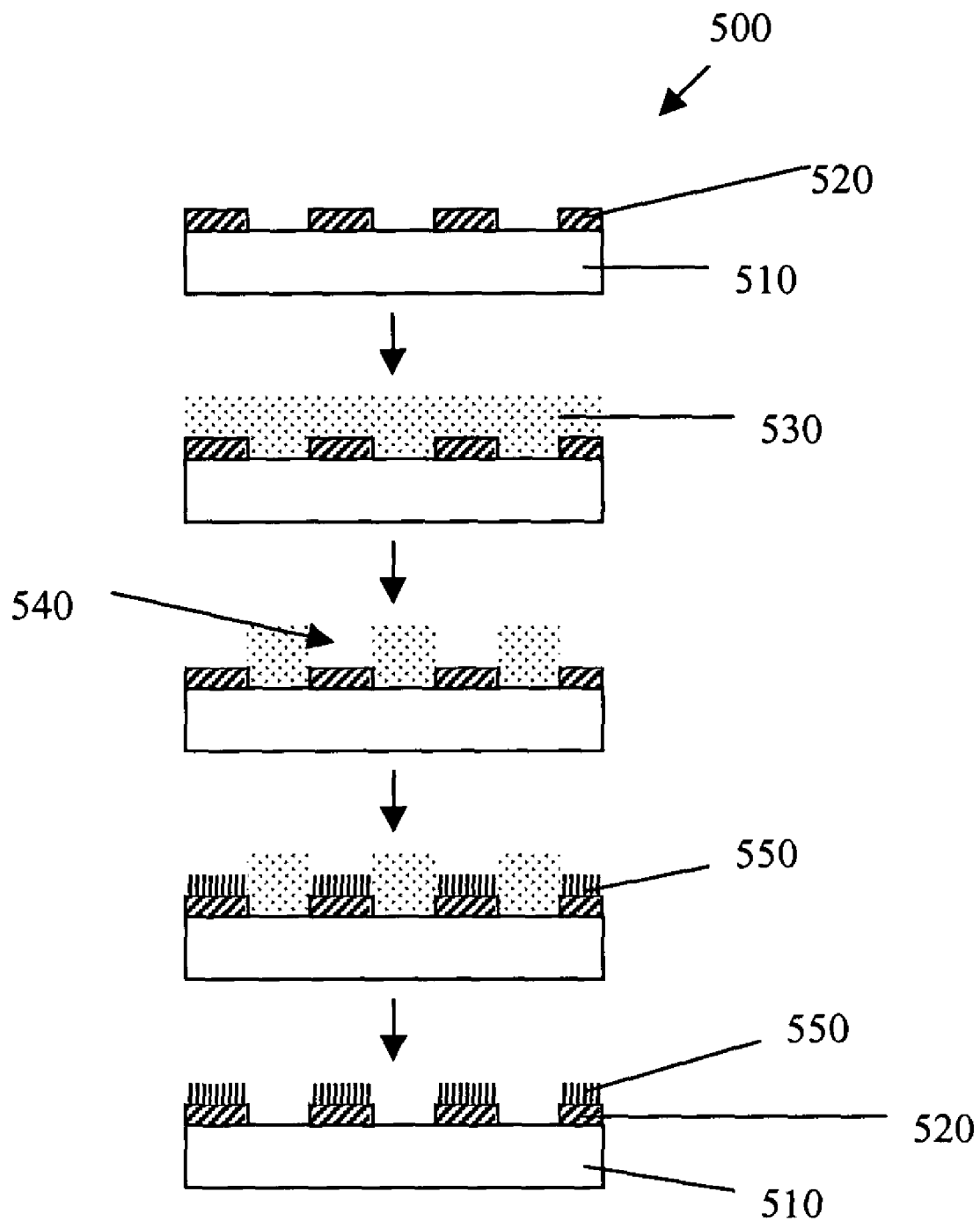
FIG. 5 is a schematic illustration of a process performed according to a further embodiment of the present invention.

Another embodiment of a method performed according to the principles of the present invention is illustrated in FIG. 5.

The method 500 begins with a suitable substrate 510. Preferably, the substrate 510 is an insulator or semiconductor, such as glass or Si. A plurality or pattern of conductive contacts 520 are deposited onto the substrate 510 using any suitable technique.

A layer of suitable photoresist material 530 is then deposited thereon, and patterned to form openings 540 which correspond to the contacts 530. The material selected and patterning technique can take any suitable form, such as any of those previously described herein.

At least one layer 550 of nanostructure-containing material is deposited through openings 540 onto contacts 530. Preferably, the nanostructure-containing material comprises carbon nanotubes, and the deposition technique comprises electrophoretic deposition.

The remaining photoresist material 530 is removed. The process 500 may further include one or more of the additional optional processing steps described previously, including those described in connection with process 400.

EXAMPLE 1

A thin layer (a few nanometers) of Omnicoat (commercial SU-8 release layer product from MicroChem, Inc.) is spin coated on the substrate at 3000 rpm for 30 seconds, and baked in contact with hotplate surface at 200 C for 1 minute. Next SU-8 photoresist is spin coated and baked in two steps at 65 C and at 95 C. Depending on the desired SU-8 thickness, spin speed and viscosity of SU-8 can be controlled. After baking the SU-8 film is exposed to UV light with a photomask. The sample is then baked at 65 C and 95 C as a post-exposure bake step. The sample is then put in SU-8 developer commercially available from Microchem, Inc. and rinsed with isopropyl alcohol.

Next the sample is put in a bath of Omnicoat developer (commercial product from MicroChem, Inc.) and kept for 30 seconds with a gentle agitation to develop Omnicoat exposed to the developing solution. Finally the sample is rinsed with deionized water, and dried thoroughly with filtered nitrogen.

The prepared SU-8 template was used as an electrode in the elctrophoretic deposition of carbon nanotubes onto conducting surfaces of the template exposed between SU-8 masking. Under the optimized conditions, essentially all the nanotube-containing materials are deposited onto the exposed substrate surfaces which are negatively charged during deposition when $MgCl_2$ is used as the charger. There are very few carbon nanotubes deposited on the SU-8 surface, except near the edges of the open areas.

After depositing the carbon nanotubes by electrophoretic deposition, the SU-8 mask is removed by Omnicoat release layer lift-off. This is done by putting the sample in a Omnicoat remover (Remover PG, NMP based, commercial product from Microchem, Inc.) prepared at 80° C. and kept with agitation for 10 minutes. Once the whole SU-8 structure is removed from the surface, the sample is removed from the Omnicoat remover. The sample is then optionally rinsed in a suitable solvent to remove the residual Remover PG. One example is to rinse in several Actone baths with a very gentle stirring motion. To remove any extra organics absorbed into teh carbon nanotubes during SU-8 removal, the sample is annealed at an appropriate temperature which can be tolerated by the substrate, e.g.—450° C. for ITO coated glass, 800° C. for stainless steel). The sample is annealed under dynamic vacuum of $10^{-7}$ Torr.

EXAMPLE 2

A carbon nanotube suspension is prepared by dispersing small amount of carbon nanotubes with an appropriate charger in ultrasonic bath, e.g.—2 mg of carbon nanotubes was mixed with 1 mg of $MgCl_2$ in 200 mL of ethyl alcohol, and kept under sonication for 1 hour.

A substrate was spin-coated with a layer of SU8 photoresist material (purchased from MicroChem, Inc.). Depending on the viscosity and the spin speed used for spin-coating, the final thickness of the SU8 can vary from 3-100 micrometers. To remove remaining solvent, the SU8 film the sample was heated. For example, a film of SU8 25 photoresist material was baked at 65° C. for 3 minutes and then at 95° C. for 7 minutes. The sample is cooled to room temperature and subjected to contact mode UV lithography using a photomask exposed to a UV light source. The sample is baked above the glass transition temperature (55° C.) to enhance the cross linking of the SU8 molecules in the exposed area. In case of SU8 25 the sample is baked at 65° C. for 1 minute, and at 95° C. for 3 minutes. After cooling to room temperature the SU8 is developed in SU8 developer with agitation, and finally rinsed with isopropyl alcohol, and dried.

Next, the substrate with patterned SU8 film is electrically connected to one side of an electrode in the electrophoretic deposition set up. Two electrodes are submersed in the carbon nanotube suspension. An electric field is applied between the two electrodes. $Mg^{2+}$ is added to the suspension as a charger. The substrate is grounded, and the other electrode is supplied with a positive electric potential. A 20V/cm of DC field is applied for 2 minutes. After drying the sample is heated to 350-400° C. in vacuum for 1 hour and is then quenched to room temperature. The quenching is performed by directly taking the sample out of the hot furnace.

Because of the difference in the thermal expansion coefficients between the photoresist and the substrate, the photoresist film shatters upon quenching, and is easily removed by blowing with a nitrogen gun.

The resolution of the patterned carbon nanotube structures fabricated by the present invention can be as high as 1 micron and can be further increased to as high as sub-micron dimensions when e-beam lithography is used to create the photoresist patterns.

Measurement of Field Emission Properties

Figure 6:
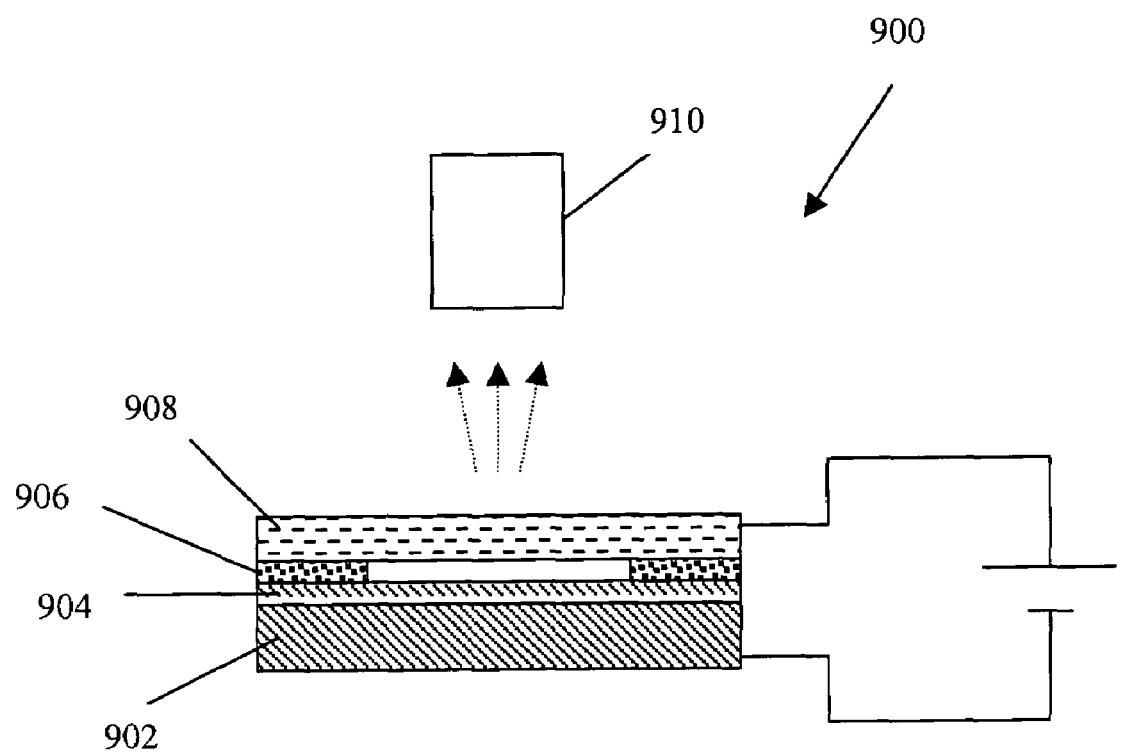
FIG. 6 is a schematic illustration of an experimental arrangement for measurement of field emission characteristics of a patterned substrate formed according to the present invention.

The electron field emission properties of the patterned deposited carbon nanotube containing structures fabricated according to the present invention can be measured using a parallel plate geometry arrangement 600, as illustrated in FIG. 6, in a vacuum chamber at $2 \times 10^{-7}$ torr base pressure. A substrate 602 is coated with carbon nanotubes 604, which is used as the cathode. A phosphor-coated ITO glass 606 is used as the anode and is placed parallel to and spaced approximately 150-200 microns away from the cathode via a mica spacer 608. A variable DC or pulsed voltage is applied between the anode and cathode. When the electric field is higher than a critical value, electrons emit from the carbon nanotubes on the cathode and bombard on the anode. A bright spot forms at the location where the electrons strike the anode. A detector 910, such as a charge-couple device (CCD) (i.e.—digital camera), is used to record the image formed on phosphor-coated ITO glass 906, which is analyzed.

The total emission current was recorded using a multimeter and the emission patterns were captured by a digital camera placed outside the vacuum chamber.

Figure 7:
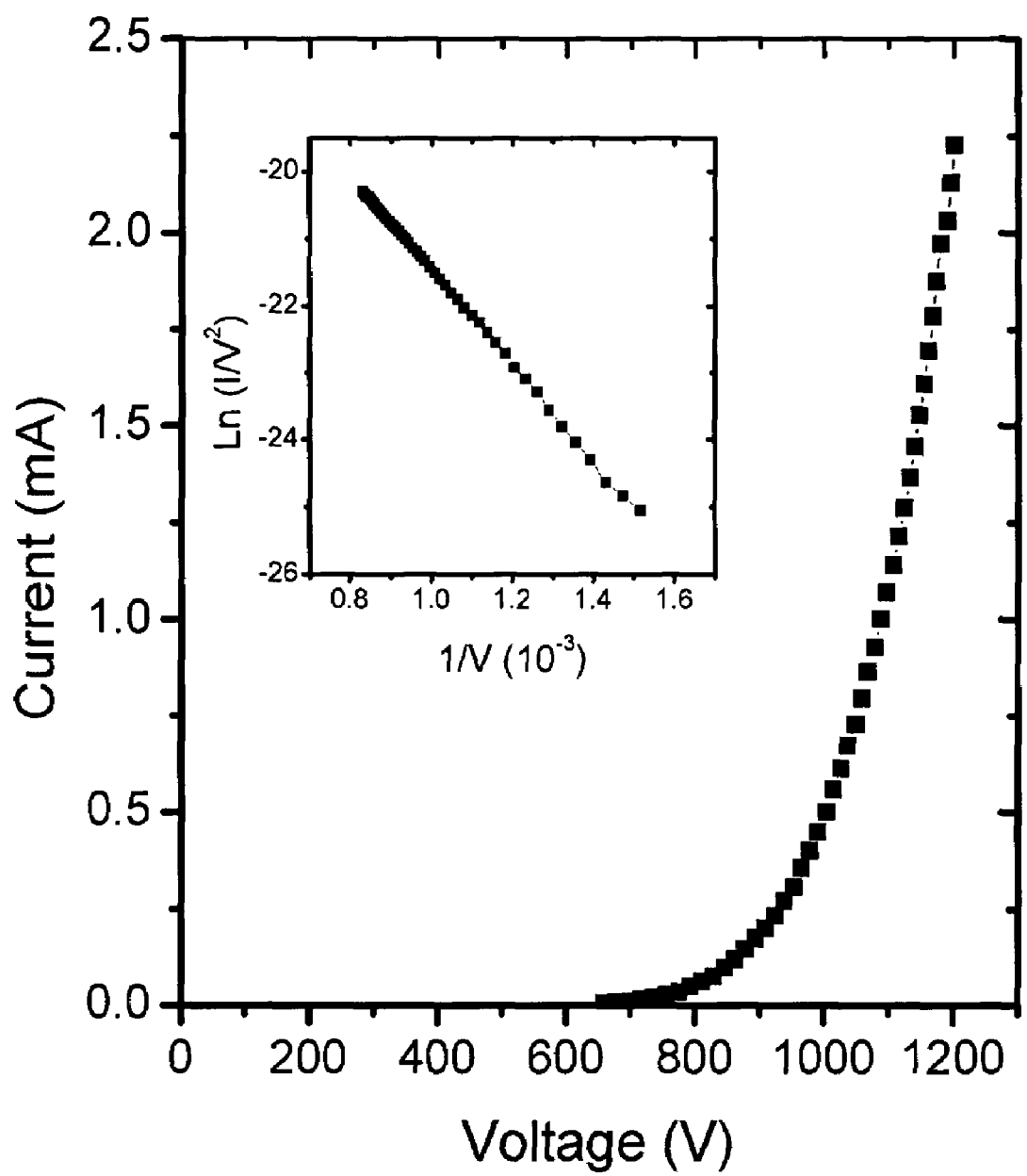
FIG. 7 is a plot of measured field emission current vs. applied electrical field from a carbon nanotube film formed according to the present invention.

FIG. 7 shows the emission I-V characteristics obtained from a patterned carbon nanotube film (100 μm line width, 500 μm pitch) fabricated using single walled carbon nanotube bundles. The inset is the Fowler-Nordheim plot of the same data which exhibits a classic linear relation between $\ln(I/V^2)$ and $1/V$. The threshold electrical field for 10 mA/cm² current density is 8 V/μm (calculated by normalizing the current with the total area covered by the nanotubes). The value is comparable to that from the self-assembled CNT cathodes.

Figure 8:
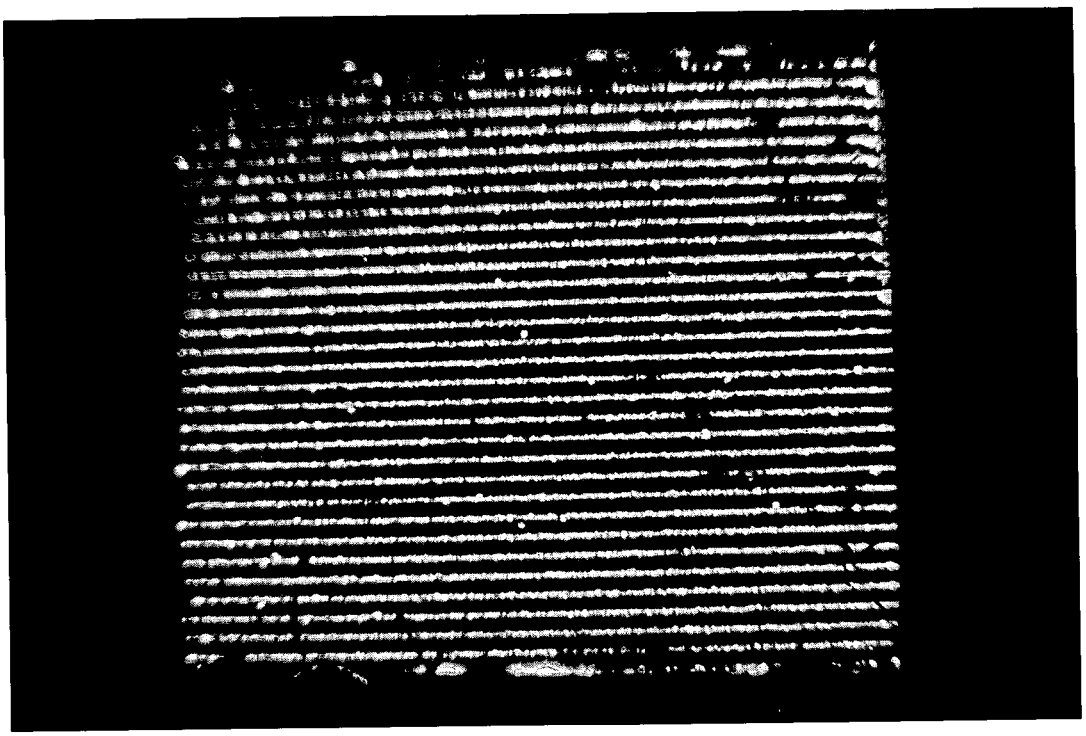
FIG. 8 is an image of the electron field emission pattern generated from a sample formed according to the present invention.
Figure 9:
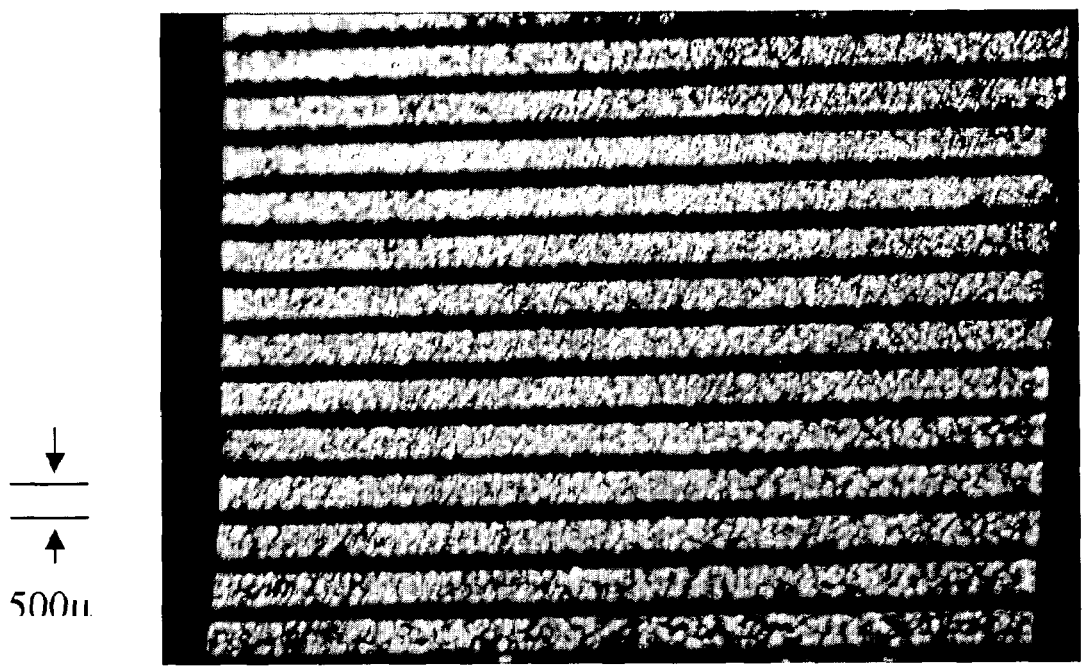
FIG. 9 is an image of the electron field emission pattern generated from a sample formed according to another aspect of the present invention.

The phosphor-screen images of the electron emission patterns were recorded by applying a pulsed voltage between the anode and the cathode. FIG. 8 shows the emission image from the entire 15 mm×20 mm-size ITO glass coated with 100 μm line-width carbon nanotube stripes formed according to Example 1. The data was collected using 100 Hz and 1% duty cycle pulse voltage. The peak emission current from the entire sample was 2.5 mA. All the CNT stripes were emitting electrons yielding uniform brightness on the green phosphor. The emission uniformity was further investigated by analyzing the digitized phosphor images. From the phosphor image, it can be seen that there are several emission sites across the width of each 20 μm pattern which translates to an emission site density of ~$5 \times 10^5$ sites/cm². At 500 mm width (FIG. 9) there are sufficient numbers of emission sites per line to render a uniform image. At either a higher electrical field or a higher duty cycle than the valued used here, the high emission current saturates the phosphor screen such that the individual emission sites can no longer be resolved.

Figure 10:
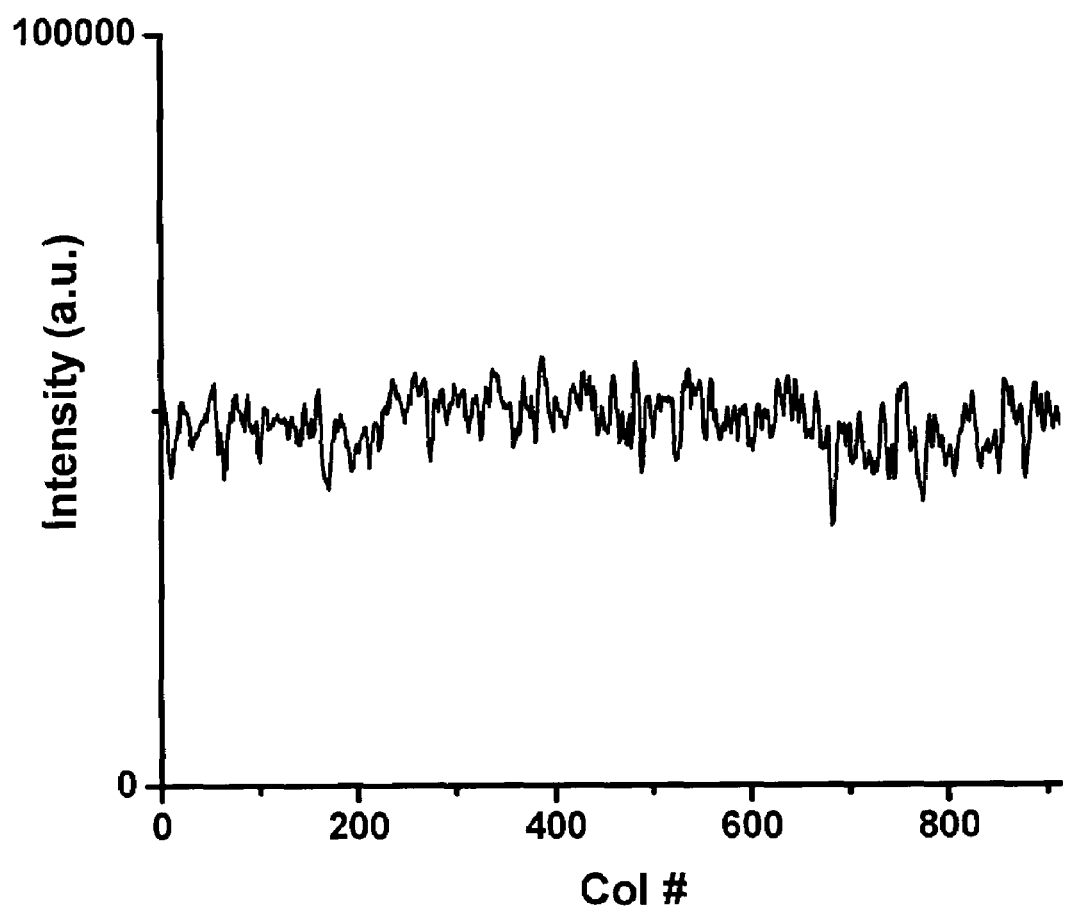
FIG. 10 is a plot of the intensity of emitted electrons across the length of a deposit of carbon nanotubes according to the present invention.

FIG. 10 traces the brightness of one 500 μm width emission line across the length of a sample. Without the use of ballast resistor, the intensity fluctuation was found to be less than 8%. The brightness across each line is relatively uniform especially for those with a width larger than 100 μm. No edge emission was observed across the entire sample.

While the present invention has been described by reference to the above-mentioned embodiments, certain modifications and variations will be evident to those of ordinary skill in the art. Therefore, the present invention is limited only by the scope and spirit of the appended claims.

What is claimed is:

1. A method of depositing a pattern of nanostructure-containing material onto a substrate, the method comprising:
   (i) forming a suspension containing pre-formed carbon nanotubes and adhesion promoting materials in an alcohol-based liquid medium, wherein the adhesion promoting materials are selected from the group consisting of glass frits, binders, metal particles and combinations thereof;
   (ii) depositing a release layer on the surface of the substrate, depositing a layer of epoxy-based photoresist on the release layer, masking the photoresist with a mask having openings which expose the underlying photoresist to UV light and forming a pattern of openings in the photoresist by UV photolithography;
   (iii) immersing electrodes in the suspension, wherein at least one of the electrodes comprises the substrate or is electrically connected to the substrate;
   (iv) applying a direct or alternating current to the immersed electrodes thereby creating an electrical field between the electrodes; whereby the carbon nanotubes are caused to migrate toward, and attach to, areas of the substrate exposed by the patterned photoresist; and
   (v) activating the deposited carbon nanotubes, wherein the activation is selected from the group consisting of sonication, rubbing, tapping, brushing, blowing, plasma treatment, application of an electrical field in a vacuum, application of an electrical field under a partial oxygen pressure, and combinations thereof.

2. The method of claim 1, further comprising adding a chemical to the suspension that promotes migration of the nanostructure-containing material to the substrate.

3. The method of claim 1, wherein the carbon nanotubes comprise at least one of single-walled and multi-walled carbon nanotubes.

4. The method of claim 1, wherein the method further comprises annealing the pre-formed nanotubes at 100° C.-1200° C. in a vacuum prior to their introduction into the suspension.

5. The method of claim 1, wherein the liquid medium comprises at least one of water, ethyl alcohol, and isopropyl alcohol.

6. The method of claim 2, wherein the chemical comprises at least one of $MgCl_2$, $Mg(NO_3)_2$, $La(NO_3)_3$, $Y(NO_3)_3$, $AlCl_3$, and sodium hydroxide.

7. The method of claim 1, wherein the substrate comprises an electrically conductive material or a semiconductor material.

8. The method of claim 1 wherein the carbon nanotubes comprise single-walled carbon nanotubes, and step (i) further comprises forming a suspension having a concentration of 0.01 mg/liter to 1 g/liter.

9. The method of claim 1, wherein step (iv) comprises applying direct current to the electrodes.

10. The method of claim 9, wherein the electrical field applied between the two electrodes is in the range of 0.1-1000 V/cm and the direct current is in the range of 0.1-200 mA/cm².

11. The method of claim 1, further comprising the steps of:
   (v) removing the electrodes from the suspension; and
   (vi) annealing the coated substrate.

12. The method of claim 11, wherein step (vi) comprises a two-step anneal, comprising heating the coated substrate to a first temperature for a selected period of time, then heating the coated electrode to a second temperature for a selected period of time.

13. The method of claim 11 further comprising the steps of: annealing the coated substrate comprising the photoresist layer at 100° C.-400° C.; quenching the coated substrate comprising the photoresist layer to room temperature; and removing the photoresist layer.

14. The method of claim 1, wherein the binder is at least one of poly(vinyl butyral-co vinyl alcohol-co-vinyl acetate) and poly(vinylidene fluoride).

15. The method of claim 1, wherein the metal particles comprise small particles of at least one of: iron; titanium; lead; tin; or cobalt; and wherein the particles have a diameter less than 1 micrometer.

16. The method of claim 1, further comprising pre-coating at least one adhesion promoting layer onto the substrate prior to coating with the carbon nanotubes.

17. The method of claim 16, wherein the adhesion-promoting layer comprises at least one of: iron; titanium; cobalt; nickel; tantalum; tungsten; niobium; zirconium; vanadium; chromium; and hafnium.

18. The method of claim 1, wherein the thickness of the photoresist layer is in the range of 1-100 microns.

19. The method of claim 1, further comprising the step of removing the photoresist layer after deposition of the nanostructure-containing material.

20. The method of claim 19, wherein the photoresist layer is removed by a methods chosen from: dissolving in a solvent, sonication, and preferential decomposition.

21. The method of claim 1, wherein the photoresist layer is insoluble in liquid.

22. The method of claim 1, wherein the photoresist layer is insoluble in alcohol.

23. The method of claim 1, wherein the photoresist layer comprises negative-type epoxy based material.

24. A method of fabricating a patterned electron field emission cathode comprising a substrate coated with pre-formed carbon nanotube-containing material, the method comprising:
   (i) preparing an alcohol-based stable liquid suspension or solution containing the pre-formed carbon nanotube materials and adhesion promoting materials, wherein the adhesion promoting materials are selected from the group consisting of glass frits, binders, metal particles and combinations thereof;
   (ii) depositing a layer of insoluble epoxy-based photoresist on the surface of the substrate;
   (iii) masking the photoresist with a mask having openings which expose the underlying photoresist to UV light and patterning the photoresist by UV photolithography techniques such that openings are formed in the photoresist layer corresponding to areas on the substrate onto which carbon nanotube-containing material is to be deposited;
   (iv) inserting two electrodes into the liquid where the substrate is, or is electrically connected to, one of the two electrodes, and applying an electrical field between the two electrodes such that the carbon nanotube-containing material is deposited on the surface of the substrate corresponding to the openings in the photoresist layer;
   (v) removing the photoresist layer from the; and
   (vi) activating the deposited carbon nanotube-containing material, wherein the activation is selected from the group consisting of sonication, rubbing, tapping, brushing, blowing, plasma treatment, application of an electrical field in a vacuum, application of an electrical field under a partial oxygen pressure, or combinations thereof.

25. The method of claim 24, wherein the substrate comprises a plurality or a pattern of conductive contacts disposed on the surface of an insulating or semiconductor material.

26. The method of claim 24, wherein the activation process comprises removal of excess carbon nanotubes that are not bonded to the substrates and removal of non-uniform carbon nanotube protrusions.

27. The method of claim 24, wherein step (iv) is repeated a plurality of times to deposit multiple layers of material.

28. A method of fabricating a patterned electron field emission cathode comprising a substrate coated with pre-formed carbon nanotube-containing material, the method comprising:
   (i) preparing an alcohol-based liquid suspension or solution containing the pre-formed carbon nanotube materials and adhesion promoting materials, wherein the adhesion promoting materials are selected from the group consisting of glass frits, binders, metal particles and combinations thereof;
   (ii) depositing a release layer on the surface of the substrate;
   (iii) depositing a layer of epoxy-based photoresist that is insoluble in the liquid onto the surface of the release layer;
   (iv) masking the photoresist with a mask having openings which expose the underlying photoresist to UV light and patterning the photoresist by UV photolithography techniques such that openings are formed in the photoresist layer corresponding to areas on the substrate onto which carbon nanotube-containing material is to be deposited;
   (v) removing the release layer exposed by the openings in the photoresist to expose substrate surfaces;
   (vi) depositing the carbon nanotube containing materials onto the surfaces of the exposed substrate surfaces;
   (vii) removing the photoresist layer and the release layer from the substrate while keeping the carbon nanotube-containing materials on the substrate surface; and
   (viii) activating the deposited carbon nanotube-containing material, wherein the activation is selected from the group consisting of sonication, rubbing, tapping, brushing, blowing, plasma treatment, application of an electrical field in a vacuum, application of an electrical field under a partial oxygen pressure, or combinations thereof.

29. The method of claim 28, wherein the method of depositing carbon nanotube-containing materials in step (vi) comprises electrophoresis, spin coating, casting, printing, or spraying.

30. The method of claim 28, wherein the method of depositing carbon nanotube-containing materials in step (vi) comprises DC electrophoretic deposition, wherein the electrophoretic deposition comprises: inserting two electrodes into the liquid where the substrate is, or is electrically connected to, one of the two electrodes, and applying an electrical field between the two electrodes such that the carbon nanotube-containing material is deposited on the surface of the substrate corresponding to the openings in the photoresist layer.

31. The method of claim 28, wherein the carbon nanotube-containing materials comprise at least one of the following: single-wall carbon nanotubes, double-wall carbon nanotubes, multi-wall carbon nanotubes.

32. The method of claim 28, wherein the carbon nanotubes are hydrophilic.

33. The method of claim 28, wherein the substrate is indium-tin-oxide coated glass, conducting paste coated glass, metal coated glass, metal, polymer, or Si wafer, and wherein the areas to be deposited with the carbon nanotube-containing materials are conductive.

34. The method of claim 28, wherein step (vii) comprises removing the photoresist by release layer lift-off.

35. The method of claim 28, wherein the photoresist comprises a negative epoxy based photoresist, wherein the release layer is a chemical that can be removed by certain solvents, and wherein the release layer lift-off is performed by dissolving the release layer with the solvent.

36. The method of claim 28, further comprising at least one of the following: rinsing the substrate in solvents and baking and annealing the substrate.

37. The method of claim 28, wherein the activation process comprises removal of excess carbon nanotubes that are not bonded to the substrates and removal of non-uniform carbon nanotube protrusions.

38. The method of claim 28, wherein step (vi) is repeated a plurality of times to deposit multiple layers of material.

* * * * *